(12) United States Patent  (10) Patent No.: US 11,463,961 B2
Gupta et al.  (45) Date of Patent: Oct. 4, 2022

(54) UPLINK POWER CONTROL USING DEEP Q-LEARNING

(71) Applicant: Nokia Solutions and Networks Oy, Espoo (FI)

(72) Inventors: Richa Gupta, Bangalore (IN); Suresh Kalyanasundaram, Bangalore (IN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/605,398

(22) PCT Filed: May 15, 2020

(86) PCT No.: PCT/EP2020/063673
§ 371 (c)(1),
(2) Date: Oct. 21, 2021

(87) PCT Pub. No.: WO2020/244906
PCT Pub. Date: Dec. 10, 2020

(65) Prior Publication Data
US 2022/0217645 A1  Jul. 7, 2022

(30) Foreign Application Priority Data
Jun. 3, 2019  (FI) ...................................... 20195470

(51) Int. Cl.
*H04W 52/00*  (2009.01)
*H04W 52/14*  (2009.01)
(Continued)

(52) U.S. Cl.
CPC ....... *H04W 52/146* (2013.01); *H04W 52/242* (2013.01); *H04W 52/281* (2013.01)

(58) Field of Classification Search
CPC . H04W 52/00; H04W 52/146; H04W 52/242; H04W 52/281
(Continued)

(56) References Cited

U.S. PATENT DOCUMENTS

| 2016/0135128 A1* | 5/2016 | Lee | ................... H04W 72/0413 |
| | | | 370/311 |
| 2017/0086150 A1 | 3/2017 | Wang | |

(Continued)

FOREIGN PATENT DOCUMENTS

| CN | 102017723 A | 4/2011 |
| CN | 104955116 A | 9/2015 |

(Continued)

OTHER PUBLICATIONS

3GPP TS 38.213 V16.7.0 (Sep. 2021); 3rd Generation Partnership Project; Technical Specification Group Radio Access Network; NR; Physical layer procedures for control (Release 16), Sep. 2021.

(Continued)

*Primary Examiner* — Hai V Nguyen
(74) *Attorney, Agent, or Firm* — Harness, Dickey & Pierce, P.L.C.

(57) ABSTRACT

According to an aspect, there is provided a computing device for controlling terminal device uplink transmission power. Each terminal device is configured to determine uplink transmission power based on two power control parameters—a target received power for full pathloss compensation and a pathloss compensation coefficient. The computing device initializes a deep Q-learning network in which a state is defined as cell-specific pairs of the power control parameters, an action is defined as a selection of valid values of power control parameters for a cell and a reward is calculated based on the information on data traffic. The computing device trains the deep Q-learning network to (Continued)

approximate a Q value function, determines optimal power control parameters based on thereon and causes transmitting them to access nodes.

14 Claims, 8 Drawing Sheets

(51) Int. Cl.
*H04W 52/28* (2009.01)
*H04W 52/24* (2009.01)

(58) Field of Classification Search
USPC .................................................. 455/455, 69
See application file for complete search history.

(56) References Cited

U.S. PATENT DOCUMENTS

| | | |
|---|---|---|
| 2017/0278018 A1 | 9/2017 | Mnih et al. |
| 2017/0359754 A1 | 12/2017 | Yousefi'zadeh et al. |
| 2019/0116560 A1 | 4/2019 | Naderializadeh et al. |

FOREIGN PATENT DOCUMENTS

| | | | |
|---|---|---|---|
| CN | 108112082 A | 6/2018 | |
| CN | 109194583 A | 1/2019 | |
| CN | 109714786 A | 5/2019 | |
| WO | WO-2018068857 A1 * | 4/2018 | ............ H04W 24/08 |

OTHER PUBLICATIONS

International Search Report PCT/ISA/210 and Written Opinion of the International Searching Authority PCT/ISA/237 for International Application No. PCT/EP2020/063673 dated Jul. 28, 2020.
Chu, M. et al. "Reinforcement Learning-Based Multiaccess Control and Battery Prediction with Energy Harvesting in IoT Systems." IEEE Internet of Things Journal, Sep. 27, 2018.
3GPP TS 38.213 V15.5.0 (Mar. 2019); 3rd Generation Partnership Project; Technical Specification Group Radio Access Network; NR; Physical layer procedures for control (Release 15), Mar. 27, 2019.
Finnish Office Action for Finnish Patent and Registration Office Application No. 20195470 dated Sep. 25, 2019.
Finnish Communication of Acceptance for Finnish Patent and Registration Office Patent No. 20195470 dated Mar. 13, 2020.
Anritsu, "Setting of NPUSCH power for NB-IoT Test cases," 3GPP TSG-RAN5 Meeting #72, Gothenburg, Sweden, Aug. 22-26, 2016.

* cited by examiner

UPLINK POWER CONTROL USING DEEP Q-LEARNING

CROSS-REFERENCE TO RELATED APPLICATIONS

This application is a national phase under 35 U.S.C. § 371 of PCT International Application No. PCT/EP2020/063673, which has an International filing date of May 15, 2020, which claims priority to Finnish Application No. 20195470, filed Jun. 3, 2019, the entire contents of each of which are hereby incorporated by reference.

TECHNICAL FIELD

Various example embodiments relate to wireless communications.

BACKGROUND

The uplink (UL) performance of the wireless cellular networks depends on transmit power used by each user. The power used for uplink transmission by each user is controlled by the serving cell. In 5G NR and LTE, a combination of open-loop and closed loop power control is used to adapt the transmit power of a terminal device (UE) to achieve good overall uplink performance. If the transmit power is too high, interference to neighboring cells becomes a problem. On the other hand, if the transmit power is too low, the average throughput and/or peak throughput is reduced and loss of coverage may occur. The serving cell sends values of various parameters to terminal devices for controlling uplink transmission power. The challenge at the network level is to decide the values of these parameters such that users in the cell achieve the best overall performance without causing significant interference to other users in the neighbor cells.

BRIEF DESCRIPTION

According to an aspect, there is provided the subject matter of the independent claims. Embodiments are defined in the dependent claims. The scope of protection sought for various embodiments of the invention is set out by the independent claims.

The present invention may also relate to a computing device for controlling uplink transmission power of a plurality of terminal devices in a plurality of cells, wherein each terminal device is configured to determine its uplink transmission power based on at least a target received power per physical resource block, PRB, for full pathloss compensation and a pathloss compensation coefficient, the computing device comprising means for performing:

maintaining, in a database, information on data traffic in the plurality of cells involving the plurality of terminal devices;

initializing a deep Q-learning network in which a state is defined as a set of pairs of the target received power per PRB for full pathloss compensation and the pathloss compensation coefficient, wherein each pair corresponds to one of the plurality of cells, an action in a given state is defined as a selection of valid values of the target received power per PRB for full pathloss compensation and the pathloss compensation coefficient for a pair for which valid values have not yet been set and a reward of taking an action is calculated based on the information on the data traffic in the plurality of cells so as to optimize overall uplink performance over all of the plurality of cells;

training the deep Q-learning network with a plurality of random states and a plurality of random actions to approximate a Q value function, wherein each random state comprises initially a pre-defined number of pairs of the target received power per PRB for full pathloss compensation and the pathloss compensation coefficient having random valid values with the rest of the pairs in each random state having invalid values;

determining, for each cell, an optimal target received power per PRB for full pathloss compensation and an optimal pathloss compensation coefficient based on the Q value function; and causing transmitting optimized values of the target received power per PRB for full pathloss compensation and the pathloss compensation coefficient to the plurality of access nodes for further transmission to the plurality of terminal devices. The means may comprise:

at least one processor; and at least one memory including computer program code, said at least one memory and computer program code configured to, with said at least one processor, cause the performance of the computing device.

The embodiments and features, if any, described in this specification that do not fall under the scope of the independent claims are to be interpreted as examples useful for understanding various embodiments of the invention.

BRIEF DESCRIPTION OF DRAWINGS

In the following, example embodiments will be described in greater detail with reference to the attached drawings, in which.

DETAILED DESCRIPTION OF SOME EMBODIMENTS

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
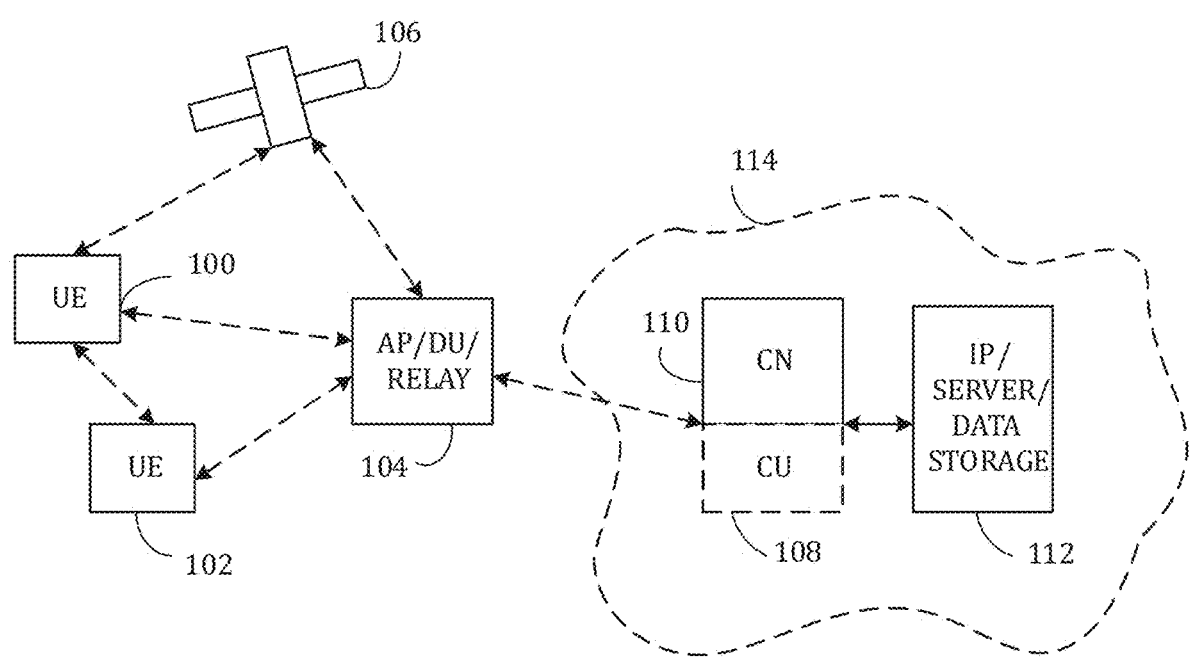
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 (equally called terminal devices) configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal or terminal device) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors micro-controllers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices are depicted to include 2 antennas only for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home (e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

The embodiments to be discussed below relate to specifically uplink (UL) power control in a wireless communications system such as the system illustrated in FIG. 1. The uplink communication in a wireless performance of the wireless communications networks (or wireless cellular networks) depends on transmit power used by each terminal device. The power used for uplink transmission by each terminal device is usually controlled by the serving cell (i.e., by an access node providing the serving cell). For example in 5G NR and LTE, a combination of open-loop and closed loop power control is used to adapt the transmit power of each terminal device so as to achieve overall good performance for uplink communication. If the transmit power is too high, interference to neighboring cells becomes a problem. On the other hand, if the transmit power is too low, the average throughput and/or peak throughput is reduced and loss of coverage may occur. The serving cell sends values of various parameters to terminal devices for performing open-loop uplink transmission power computation. In addition, the serving cell also transmits closed-loop power control commands to further refine the computed open-loop transmit power. The challenge at the network is to decide the values of these parameters such that users in the cell achieve the best overall performance, considering the requirement that power transmitted by a terminal device should not cause significant interference to other terminal devices in the neighbor cells. The open-loop power control parameters, which have to be set at each cell of each access node, should preferably be adaptable dynamically to the variation in, for example, traffic density, user distribution and channel characteristics.

According to some embodiments, each terminal device in a wireless communications network is assumed to determine its Physical Uplink Shared Channel (PUSCH) transmission power (in dBm), in a PUSCH transmission occasion i and using a parameter set configuration with an index j, with the equation:

$$P_{PUSCH}(i,j) = \min\{P_{CMAX}, 10 \log_{10}(2^\mu M_{PUSCH}(i)) + P_{0,PUSCH}(j) + \alpha(j)PL + \Delta_{TF}(i) + f(i)\}, \quad (1)$$

where
$P_{CMAX}$ is a maximum transmission power configured for the terminal device in dBm, μ denotes the chosen subcarrier spacing following the NR numerology notation with each subframe consisting of $2^\mu$ slots (μ being an integer larger than or equal to zero), $M_{PUSCH}(i)$ is the number of physical resource blocks (PRBs) allocated to the terminal device, $P_{0,PUSCH}(j)$ is a power parameter set by a serving cell corresponding to a target received power per physical resource block for full pathloss compensation composed of a sum of $P_{0,NOMINAL_{PUSCH}}(j)$ and $P_{0,UE\_PUSCH}(j)$, $\alpha(j)$ is a pathloss compensation coefficient set by a serving cell in a cell-wide fashion, PL is the downlink pathloss in dB calculated by the terminal device, $\Delta_{TF}(i)$ is 0 if $K_s=0$ ($K_s$ being a parameter based on the configuration of the terminal device), and it is equal to $10 \log(2^{K_s*MPR}-1)\beta_{PUSCH\_OFFSET}$ for $K_s=1.25$ (MPR being maximum power reduction) and f(i) represents closed-loop power control correction in dB, where $f(i)=f(i-1)+\delta_{PUSCH}(i-K_{PUSCH})$, where $\delta_{PUSCH}$ is the transmission power control command for power up/down received in a slot.

Specifically, the above equation may provide PUSCH transmission power for a particular active UL bandwidth part (BWP), a particular carrier (frequency) and a particular serving cell. A bandwidth part is a contiguous set of physical resource blocks (PRBs) on a given carrier. In other embodiments, another equation may be employed for determining the uplink transmission power for a terminal device. However, it is assumed in the following that the calculation of the uplink transmission power by the terminal device is based at least on a target received power per physical resource block (PRB) for full pathloss compensation ($P_0$ or $P_{0,PUSCH}$) and a pathloss compensation coefficient (α). Additionally or alternatively, the channel for which the embodiments are applied may be a channel other than PUSCH. The PUSCH transmission power may be defined as described in 3GPP TS 38.213.

According to some more general embodiments, each terminal device of a plurality of terminal devices in the wireless communications network is configured to determine its uplink transmission power as a minimum of a maximum transmission power configured for said terminal device in decibels and a sum of two or more terms in decibels, the two or more terms comprising at least the target received power per physical resource block for full pathloss compensation in decibels and the pathloss compensation coefficient multiplied by a downlink pathloss calculated by said terminal device in decibels. At least one of the two or more terms may relate to the number of PRBs allocated to the terminal device.

The embodiments are specifically related to determining optimal values of the power control parameters $P_0$ and α which may be decided on a per-cell basis to improve (or maximize) the overall system performance over all cells. The other parameters in the above power control equation may be determined every slot based on the allocated resource(s) and hybrid automatic repeat request (HARQ) feedback based on decoding of the received data.

The parameters $P_0$ and α may have a variety of different combinations of values according to LTE and/or 5G NR. The number of different allowed combinations is very large, especially in 5G NR, and thus making an exhaustive search over all allowed values for each of the cells in an optimization area of interest is a very demanding combinatorial optimization problem which cannot be solved exactly due to the exponential computational complexity. If there are N possible values of $P_0$ and M possible values of α and there are C cells in the optimization area of interest, then the number of combinations to search over to determine the optimal solution is $(NM)^C$. Thus, even with 5 possible values of $P_0$ and α and an optimization area involving 10 cells, the number of possible combinations is approximately $9.5 \times 10^{13}$, i.e., too large for calculating feasibly. Also, due to the time-varying nature of traffic, there is a need to re-optimize the setting of these parameters dynamically over time.

The embodiments to be discussed below in detail are based on training a Deep Q-Learning Network (DQN) to find optimal values for parameters $P_0$ and α for each of a plurality of cells in a network layout so that the overall uplink system performance over said plurality of cells is optimized. The embodiments may be applied even for a large number of cells and assuming a large number of allowed values for $P_0$ and α.

To facilitate the following discussion on the embodiments based on using a Deep Q-Learning Network, deep Q-learning is discussed here briefly in general. Deep Q-learning is an advanced form of Q-learning which is a type of model-free reinforcement learning. Specifically, Q-learning involves an agent, a set of states (state space) S and a set of actions per state (action space) $A_s$. By performing an action $a \in A_{s1}$ in a first state $s_1 \in S$, a transition from the first state $s_1$ to a second state $s_2 \in S$ occurs (that is, the agent transitions from the first state $s_1$ to the second state $s_2$). When the agent executes an action in a specific state, it is provided a reward (a numerical value). The amount or value of the reward determines the quality of the taken action with regards to solving the given problem. The objective of the agent (i.e., the objective of a Q-learning algorithm) is to learn which actions to take in any given circumstances so as to maximize the accumulated reward over time. In Q-learning, the agent, thus, learns from consequences of its actions (as opposed to being from being explicitly taught). In other words, the goal in Q-learning is to find a policy that is optimal in the sense that it maximizes the expected value of the total (future) reward over any and all successive steps, starting from the current state. This goal is achieved by adding the maximum reward attainable from all future states to the (immediate) reward for achieving its current state, effectively influencing the current action by the potential future reward. This potential reward is a weighted sum of the expected values of the rewards of all future steps starting from the current state.

The objective of the Q-learning is typically formulated as a minimization problem between a target or optimal Q value (maximum possible value from the next state) and a current predicted Q value. Here, the Q values are given by a so-called Q value function (equally called action-value function) Q(s, a). The Q value function Q(s, a) gives the expected return (or expected quality value) that is obtained by starting in a state s, taking an action a and then following a pre-determined policy π. In the case Q-learning, the pre-determined policy π corresponds specifically to a so-called greedy policy where actions which result in the highest values of Q are always taken. In the case of (conventional) Q-learning, this function is specifically evaluated using a neural network. On the other hand, deep Q-learning is a special case of Q-learning where the optimal or target Q value and the current predicted Q value are estimated and converged separately using two different iterative processes. Specifically, the optimal or target Q value may be calculated by evaluating the so-called Bellman equation for Q-value iteration using a deep learning neural network (for some of the required calculations) and the current predicted Q value may be calculated directly using the same deep learning neural network. Further specifics of deep Q-learning are discussed in connection with particular embodiments.

Figure 2:
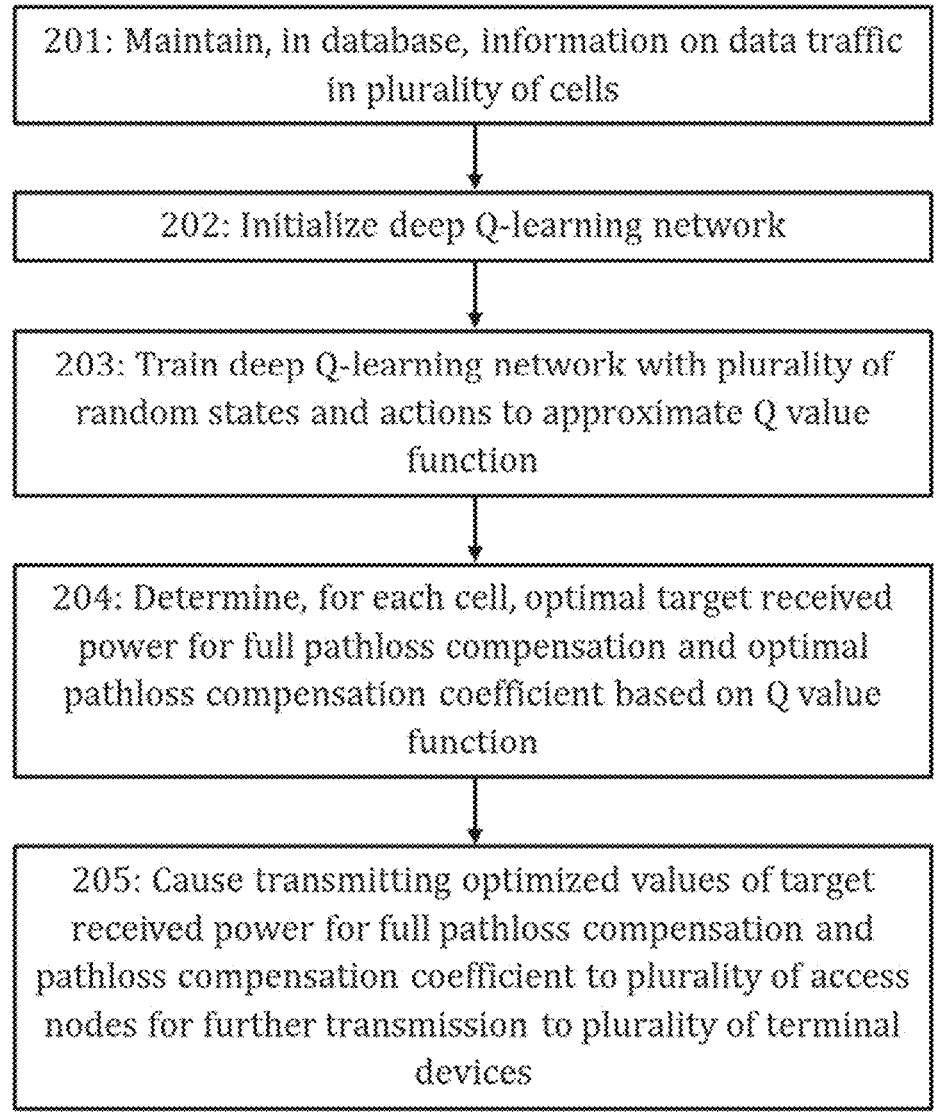
Figure 3A:
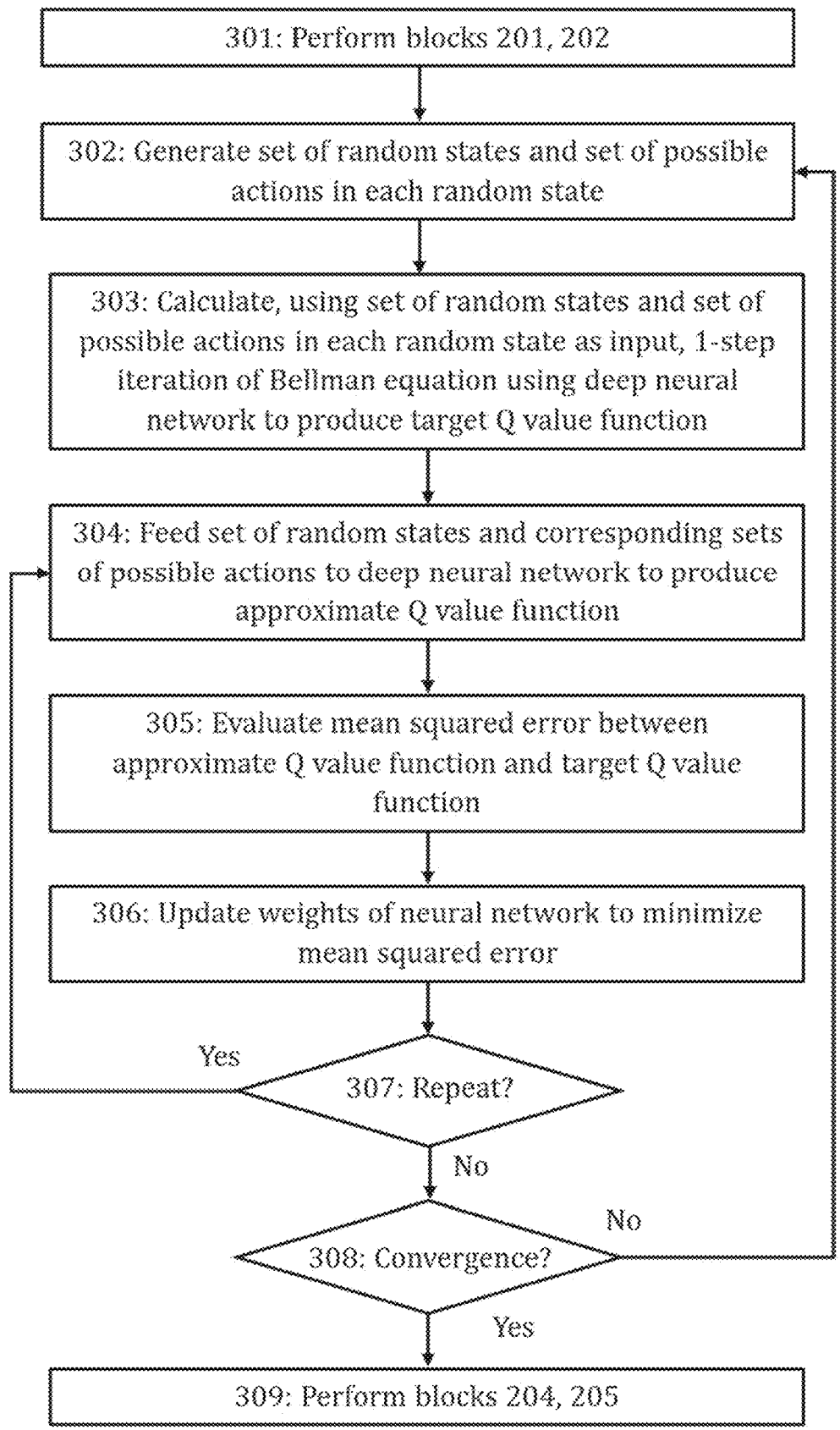
FIGS. 3A, 3B, 4, 5 and 6 illustrate exemplary processes according to embodiments.
Figure 3B:
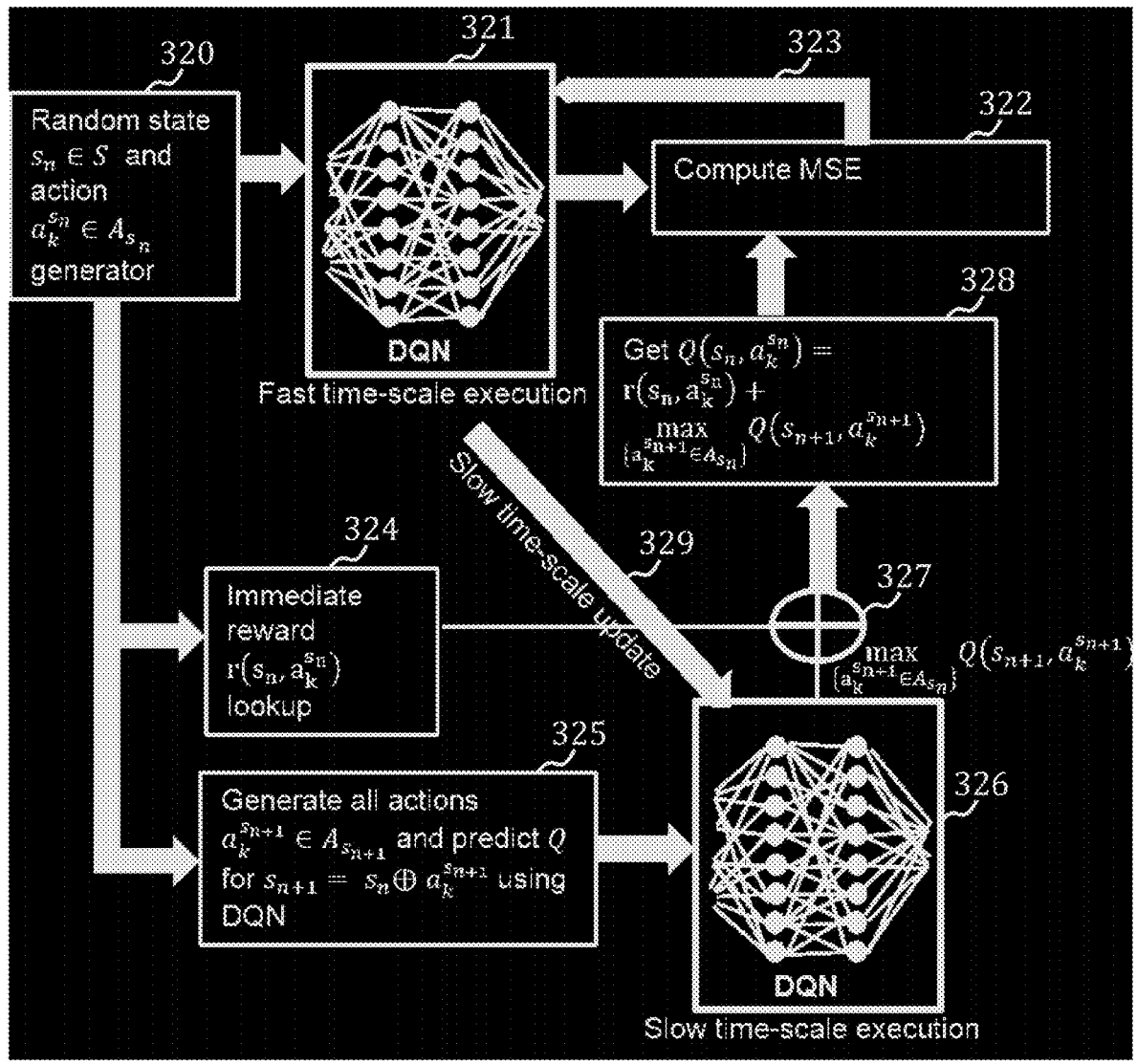
Figure 4:
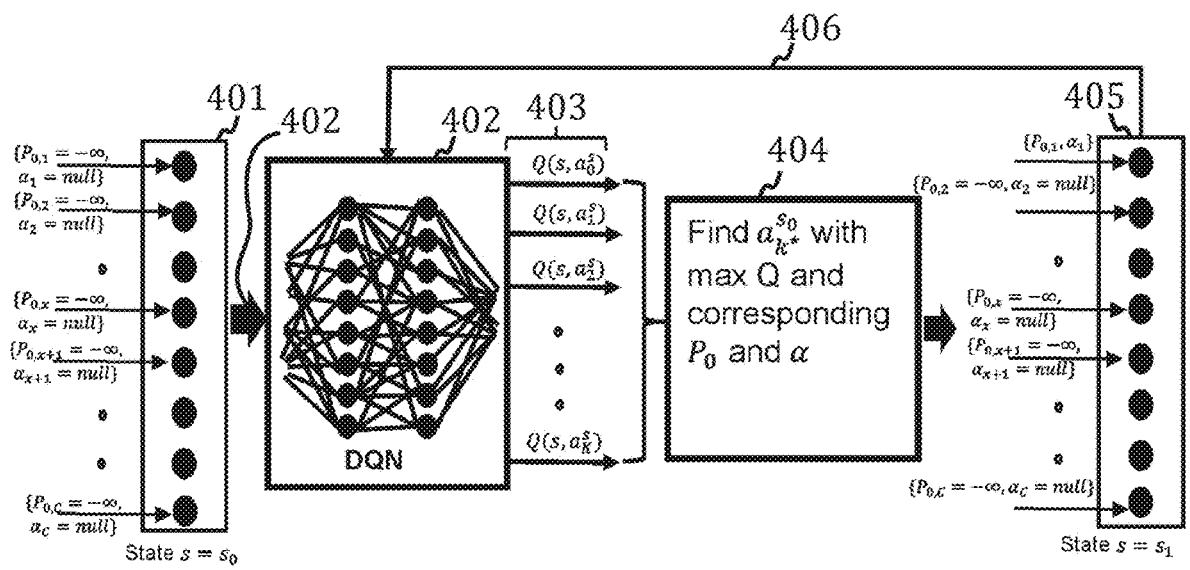

FIG. 2 illustrates a process according to an embodiment for finding optimal values for parameters $P_0$ and $\alpha$ and controlling uplink transmission power of a plurality of terminal devices in a plurality of cells by distributing said optimal values. The illustrated process may be performed in a computing platform of an access node (or a plurality of access nodes), for example, by at least one (cloud) server computer, at least one (cloud) computing device and/or at least one network element or node in a core network (or a subelement or subunit of a network element or node in a core network). Specifically, the illustrated process may be carried out by any of elements 108, 112, 114 of FIG. 1 or an (sub)element within any of elements 108, 110, 112, 114 of FIG. 1. In some embodiments, at least some of the processes according to embodiments may be carried out by an access node (e.g., element 104 of FIG. 1) and/or a terminal device (element 100, 102 of FIG. 1). In the following, the entity performing the process of FIG. 2 (as well as the following illustrated processes) is called simply a computing device. Said computing device is assumed to be connected directly or via one or more other devices and/or networks to a plurality of access nodes. The flow diagram of FIG. 2 provides a more general view of the optimization process with the following FIGS. 3A, 3B and 4 illustrating certain exemplary aspects of the optimization process in more detail.

Referring to FIG. 2, it is initially assumed that each terminal device of the plurality of terminal device in the plurality of cells is configured to determine its uplink transmission power based on at least a target received power per physical resource block for full pathloss compensation and a pathloss compensation coefficient (i.e., based at least on $P_0$ and $\alpha$). It is maintained, in block 201, in a database information on data traffic associated with the plurality of terminal devices in the plurality of cells. This information may be based on measurements conducted in the plurality of cells (possibly, by the plurality of terminal devices). Said information may comprise, for each cell of the plurality of cells, information on one or more of the following: traffic density, user distribution, configuration of terminal devices within said cell, channel characteristics (e.g., channel gain within said cell), intra-cell interference in said cell and inter-cell interference in said cell. Said information may be based on measurements performed by the plurality of terminal devices or other (terminal) devices and/or system-level simulations.

The computing device initializes, in block 202, a deep Q-learning network. The initialization may comprise setting initial values for weights of the deep Q-learning network used for estimating the Q value function during the deep Q-learning in the deep Q-learning network. The initial values may be random values or they may correspond to a pre-defined set of values. In some embodiments, all the weights may be set to the same initial value (e.g., zero). Any known initialization technique may be employed in the initialization (e.g., He initialization or Xavier initialization).

The state space, the action space and reward of the initialized deep Q-learning network in block 202 may be defined as follows.

A state may be defined as a set of pairs of the target received power ($P_0$) and the pathloss compensation coefficient ($\alpha$), where each pair corresponds to one of the plurality of cells. Each state may comprise values of the target received power per PRB for full pathloss compensation ($P_0$) and the pathloss compensation coefficient ($\alpha$) for each cell of the plurality of cells. More specifically, a state s may be defined as C-tuple of pairs of $P_0$ and $\alpha$ values $(P_{0,1}, \alpha_1)$, $(P_{0,2}, \alpha_2), \ldots, (P_{0,C}, \alpha_C)$ denoting the chosen values of these two parameters for each of the plurality of cells 1 to C (C being an integer larger than zero or in practice larger than one). The ordering of the cells may be arbitrary. Consequently, the state space S may be defined as the set of all allowed states s, i.e., $S=\{(P_{0,1}, \alpha_1), (P_{0,2}, \alpha_2), \ldots, (P_{0,C}, \alpha_C)\}$, where $P_{0,i} \in \{P_{0,min}, P_{0,min+1}, \ldots, P_{0,max}\}$ and $\alpha_i \in \{\alpha_{min}, \alpha_{min+1}, \ldots, \alpha_{max}\}$. Here, $P_{0,min}$, $P_{0,max}$, $\alpha_{min}$ and $\alpha_{max}$ are the minimum and maximum allowed values of $P_0$ and $\alpha$, respectively. For example, the ranges of allowed or valid values for $P_0$ and $\alpha$ may be −218 to 39 dBm with a step size of 1 dBm for $P_0$ and 0.4 to 1.0 with a step size of 0.1 additionally including also the value 0 for $\alpha$. Those cells for which may values have not yet been set may be given invalid temporary values $P_0=-\infty$ dBm and $\alpha=$null. Initially, each initial state may comprise valid $P_0$ and $\alpha$ values for a pre-defined number of cells with the rest of the cells having said invalid temporary values for $P_0$ and $\alpha$.

An action in a given state may be defined as a selection of valid values of the target received power per PRB for full pathloss compensation $P_0$ and the pathloss compensation coefficient $\alpha$ for a (cell-specific) pair for which valid values have not yet been set. More specifically, an action a in a given state $s \in S$ is defined as the selection of $P_0$ and $\alpha$ for the next cell, (c+1) for which an allowed value of $P_0$ and $\alpha$ is not set yet, i.e., (c+1) is the first cell in the state s where $P_{0,c+1}=-\infty$ and $\alpha_{c+1}=$null. The action space $A_s$ is the set of all allowed actions in state s, which in this case is setting the $P_0$ and $\alpha$ values for the next cell, (c+1) to one of the allowed values other than $P_0=-\infty$ dBm and $\alpha=$null, i.e., $A_s=\{(P_{0,c+1}, \alpha_{c+1})\}$ where $P_{0,c+1} \in \{P_{0,min}, \ldots, P_{0,max}\}$ and $\alpha_{c+1} \in \{\alpha_{min}, \ldots, \alpha_{max}\}$.

A reward of taking a particular action in a particular state is calculated based on the information on the data traffic in the plurality of cells so as to optimize overall uplink performance over all of the plurality of cells. More specifically, the reward r(s, a) may be the (incremental) reward of taking an action a in state s (that is, setting the $P_0$ and $\alpha$ values of one of the cells while keeping the $P_0$ and $\alpha$ values of the other cells unchanged). The reward r(s, a) may be given by the sum-utility of all cells in the plurality of cells for which valid $P_0$ and $\alpha$ values have been set including the new cell (i.e., the cell for which values were set by taking the action) minus the sum-utility of all cells for which valid $P_0$ and $\alpha$ values have been set excluding the new cell. The sum-utility may be defined as a geometric mean or a sum of terminal device throughputs of terminal devices in cell(s) for which valid values have been set. Alternatively, the sum-utility may be defined as a sum of signal to interference and noise ratios (SINRs) of terminal devices in cell(s) for which valid values have been set. It should be noted that the sum-utility may not, in practice, be calculated based on any actual set of terminal devices arranged in one or more cells for which valid values have been set and their individual throughputs or SINRs but rather based on a statistical traffic density or SINR distribution in said one or more cells, as will be discussed in the following paragraph in connection with particular exemplary embodiments.

In some exemplary embodiments, the (incremental) reward r(s, a) may be calculated based on the sum-utility (SU) of all cells (i.e., as the geometric mean of terminal device throughputs of the plurality of terminal devices in those cells whose $P_0$ and $\alpha$ values have been set) using the following equation:

$$SU = \prod_{i:P_{0,i}\neq -\infty, \alpha_i \neq null} \prod_{(x,y,z)\in i} \left(\log\left(1 + \frac{G_i(x, y, z)P_i(x, y, z)}{q(x', y', z')}\right)\right)^{\rho_i(x,y,z)} \quad (2)$$

where $P_{i,dB}(x, y, z) = \min(P_{max}, P_{0,i} + \alpha_i * PL_i(x, y, z))$ and $$q(x', y', z') =$$
$$\sigma^2 + \sum_{\substack{j, \\ j\neq i}} \sum_{(x',y',z')\in j} \frac{\rho_j(x', y', z')}{\sum_{(x',y',z')\in j} \rho_j(x', y', z')} G_i(x', y', z')P_j(x', y', z')$$

where $\rho_j(x, y, z)$ is traffic density of a given $(x, y, z)$ coordinate point for the cell j, $\sigma^2$ is the thermal noise variance, $G_i(x, y, z)$ is the channel gain (given in linear values) to a presumed terminal device at the point $(x, y, z)$ in the cell i to the serving cell i, $P_{i,dB}(x, y, z)$ is the transmit power in decibels of a (hypothetical) terminal device at the point $(x, y, z)$ served by the cell i, which is computed using the chosen value of $P_{0,i}$ (in decibels) and $\alpha_i$ for cell i, $P_i(x, y, z)$ is $P_{i,dB}(x, y, z)$ written as linear values $P_i(x, y, z)=10^{P_{i,dB}(x,y,z)/10}$, $P_{max}$ is a maximum transmission power (in decibels) configured for a (hypothetical) terminal device and $PL_i(x, y, z)$ is the pathloss (in decibels) of the (hypothetical) terminal device at the point $(x, y, z)$ which is being served by the cell i. $P_i(x, y, z)$ may be calculated using equation (1).

In equation (2), the sum utility is computed as the traffic-density weighted geometric mean of the throughputs at all the $(x, y, z)$ locations in all cells i for which the $P_0$ and $\alpha$ values have been set. While computing the interference (i.e., the double sum in the term $q(x', y', z')$), it is assumed that a single terminal device from each cell is scheduled, but the average is taken over all possible locations $(x', y', z')$ with traffic densities $\rho_j(x', y', z')$ as the weights of each location. The implicit assumption is that each location is scheduled in proportion to their traffic density. The term $G_i(x', y', z')$ is the channel gain of the location $(x', y', z')$ in cell j for the victim cell i.

The immediate reward $r(s, \alpha)$ may, then, be calculated as the difference between the sum-utilities when the new cell is included $SU_{c+1}$ and when it is excluded $SU_c$. In calculating $SU_{c+1}$, the impact of setting $P_0$ and $\alpha$ for a new cell $(c+1)$ on all the previous cells 1, 2, ..., c for which valid values for $P_0$ and $\alpha$ have been set is taken into account.

Finally, the Q value function for the deep Q-learning network in block may be defined as follows. As described above, the Q value function ($Q: S \times A \to \mathbb{R}$) in deep Q-learning gives the sum of the immediate reward of choosing action a in state $s \in S$ and the optimum (future) reward from the next state onwards. This principle may be written as:

$$Q(s, a) = r(s, a) + \max_{a'} Q(s', a'), \quad (3)$$

where s' is the next state visited by the actor from a state s when an action a is taken and a' is the next action taken in the state s'. Equation (3) may be used as a recursive update rule to estimate the action-value function Q(s,a). It should be noted that the equation (3) corresponds the so-called Bellman equation. However, there is no discount factor or rate multiplying the maximum expected future reward $$\max_{a'} Q$$

(s', a') as each step of the process is determining the $P_0$ and $\alpha$ values for the next cell in a sequence (that is, not for the next time index).

After the deep Q-learning network has been initialized in block 202, the computer device trains, in block 203, the deep Q-learning network with a plurality of random states and a plurality of random actions to approximate a Q value function for each state. Each random state comprises initially a pre-defined number of pairs of the target received power for full pathloss compensation ($P_0$) and the pathloss compensation coefficient ($\alpha$) having invalid values. As described above, each action entails adding a new pair of valid $P_0$ and $\alpha$ values corresponding to a particular cell. The basic idea of training of the deep Q-learning network is to simultaneously approximate the Q value function and execute the Bellman equation iterations (that is, iterations according to equation (3)) so as to converge the approximation of the Q value function to the exact Q value function. This is achieved by employing two optimization loops for a deep neural network (DNN): one which operates at a fast time-scale and updates the weights of the deep neural network to approximate the current best estimate of the Q value function Q(s, a) used for direct evaluation of the Q value given a state and an action and the other for slow time-scale update of the current best estimate of the Q value function (or target Q value function) determined by applying the right-hand side of equation (3)). This combination of the two DNN-based optimization loops for evaluating the Q value function may be considered to form the deep Q-learning network. The training is described in more detail in relation to FIGS. 3A and 3B.

After the training has concluded in block 303 (i.e., after a Q value function is found), the computing device determines, in block 304, for each cell, an optimal target received power per physical resource block for full pathloss compensation ($P_0$) and an optimal pathloss compensation coefficient ($\alpha$) based on the (trained) Q value function. The determining in block 304 may comprise determining, starting from a state comprising only invalid values, a set of consecutive actions each of which maximizes the Q value function for the current state. Each action in said set corresponds to an optimal target received power per physical resource block for full pathloss compensation ($P_0$) and an optimal pathloss compensation coefficient ($\alpha$) for a particular cell. How the optimal values for $P_0$ and $\alpha$ are determined is described in more detail in relation to FIG. 4.

Once the optimal values of $P_0$ and $\alpha$ for each cell have been determined in block 204, the computing device causes, in block 205, transmitting the optimized values of the target received power per physical resource block for full pathloss compensation and the pathloss compensation coefficient to the plurality of access nodes for further transmission to the plurality of terminal devices. Specifically, each message transmitted to an access node may comprise optimized values for only for one or more cells provided by the access node. The optimized values may be specifically communicated to Radio Resource Control (RRC) or Medium Access Control (MAC) of the plurality of access nodes (i.e., an eNB or a gNB) as per the architecture design. The communication of the optimized values may be achieved using Application programming interfaces (APIs) of the radio access network (RAN). RRC/MAC layers of the access nodes communicate the optimized values to the plurality of terminal devices in the plurality of cells via appropriate messages such as system information messages and/or RRC reconfiguration messages. Specifically, each message transmitted by an access node to a particular cell provided by the access node may comprise optimized values only for that particular cell provided by the access node. Depending on the nature of the computing device carrying out the process of FIG. 2, the computing device may transmit, in block 205, the optimized values itself or it may cause, block 205, one or more other computing devices or network nodes to transmit the optimized values.

FIGS. 3A and 3B illustrates the process of training a deep Q-learning network. Specifically, FIG. 3A illustrates the training process in the form of a flow chart while FIG. 3B illustrates the same training process (or at least some aspects therein according to an embodiment) with an emphasis on how the different mathematical or logical entities are connected and updated. The deep Q-learning network may be, here, the deep Q-learning network as defined in relation to FIG. 2. The operations and processes discussed in relation to FIGS. 3A and/or 3B may be carried out by any (computing) device as described in relation to FIG. 2, for example, a computing device illustrated with any of elements 108, 114 or 112 of FIG. 1 or a (sub)element within any of elements 108, 112, 114 of FIG. 1.

Referring to FIG. 3A, the computing device initially performs, in block 301, actions described in relation to blocks 201, 202 of FIG. 2 (i.e., maintains information on data traffic and initializes a deep Q-learning network). Thereafter, the actually training process starts. As described above, the basic idea in the training of the deep Q-learning network is to simultaneously approximate the Q value function and to execute (one-step) iterations of the Bellman equation (that is, iterations according to equation (3)) so as to converge the approximation of the Q value function to the exact Q value function. These two tasks are performed using two optimization loops. In the first optimization loop (comprising at least elements 320 to 323), a deep neural network is used, in element 321, for direct prediction of the Q value given a state and an action (i.e., for evaluating the Q value function Q(s, a)) and is updated, in element 323, on a fast-time scale. In the second optimization loop (comprising effectively all the elements 320 to 329), the deep neural network is used, in element 325, for evaluating the optimum (future) reward from the next state onwards (i.e., for evaluating Q(s',a') on the right-hand side of equation (3)) and is updated, in element 329, on a slow-time scale (i.e., less frequently compared to the update in element 323). In other words, both optimization loops are used for evaluating a Q value function though the resulting Q value function estimate is used for different purpose. Further, the weights of neurons of the deep neural network are updated in both optimization loops but at different intervals. The goal of the training is effectively learning the optimal weights of the neurons in the deep neural network so that the Q value function calculated directly with the deep neural network converges to the Q value function given by the 1-step iteration of the Bellman equation. It should be noted that while the deep neural network is illustrated in FIG. 3B with two elements 321, 325 to clarify the functioning of the aforementioned first and second optimization loops, these two elements 321, 325 correspond to the same deep neural network.

In the first training step, the computing device generates, in block 302, a set (or batch) of random states and a set of possible (random) actions in each random state in the set of random states. This process corresponds to block 320 of FIG. 3B. The set of possible actions in a state may comprise all the possible actions in said state. Alternatively, the set of possible actions in a state may comprise a set of randomly selected possible actions in said state, a set of actions that gives the largest Q values or any combination thereof. Each random state comprises a pre-defined number of pairs of the target received power for full pathloss compensation ($P_0$) and the pathloss compensation coefficient ($\alpha$) having invalid values. In other words, each of the generated states comprises a set of valid $P_0$ and $\alpha$ values for initial x cells 1, 2, ..., x and values $P_0 = -\infty$dBm and $\alpha =$ null for all remaining cells in the order of x+1, x+2, ..., C, where x is a positive integer. The ordering of the plurality of cells may be arbitrary but fixed as mentioned above. Each value in each set of valid $P_0$ and $\alpha$ values (both in the initially generated state and the following states resulting from performing actions) may be selected from a pre-defined set of allowed values (defined separately for $P_0$ and $\alpha$). The pre-defined set of allowed values may be defined through a pre-defined range of values and a pre-defined spacing between consecutive values. In the following, we denote $n^{th}$ state in state space S as $s_n$ and $k^{th}$ action in action space $A_{s_n}$ of $n^{th}$ state as $a_k^{s_n}$. The set of random states generated in block 302 may be denoted as $s_1, s_2, \ldots, s_N$, where N is a pre-defined number of states in a set (of states). The set of actions generated in block 302 may be denoted as $a_1^{s_1}, a_2^{s_1}, \ldots, a_K^{s_1}, a_1^{s_2}, a_2^{s_2}, \ldots, a_K^{s_2}, \ldots, a_K^{s_N}$, where K is a pre-defined number of actions in a set (of actions). In some embodiments, K may be defined to be different for different states $s_1, s_2, \ldots s_N$.

Further, the computing device calculates, using the set of random states and the set of possible random actions in each random state as input, a target Q value function as one-step iterations of the Bellman equation $$Q(s_n, a_k^{s_n}) = r(s_n, a_k^{s_n}) + \max_{\{a_k^{s_{n+1}} \in A_{s_{n+1}}\}} Q(s_{n+1}, a_k^{s_{n+1}}). \quad (4)$$

Here, $Q(s_n, a_k^{s_n})$ is the target Q value function, $s_{n+1}$ is a state following the initial state $s_n$ when the action $a_k^{s_n}$ is taken, $a_k^{s_{n+1}}$ is an action performed in the state $s_{n+1}$ and $A_{s_{n+1}}$ is an action space comprising all the actions $a_k^{s_{n+1}}$ with k=1, ..., K. The (immediate) reward $r(s_n, a_k^{s_n})$ may be calculated using a lookup table maintained in the database (block 324) or using online calculation. The reward may be defined following any definition given in relation to block 202 of FIG. 2.

Compared to calculating the immediate reward calculating the approximate for the maximum expected cumulative reward $$\max_{\{a_k^{s_{n+1}} \in A_{s_{n+1}}\}} Q(s_{n+1}, a_k^{s_{n+1}})$$

is considerably more complicated. This calculation is carried out by using the deep neural network to evaluate all possible Q values $Q(s_{n+1}, a_k^{s_{n+1}})$ with $a_k^{s_{n+1}} \in A_{s_{n+1}}$. Specifically, the computing device may, first, generate, for each combination of an initial state $s_n$ and an action $a_k^{s_n}$ performed in the initial state, a following state $s_{n+1}$ and all allowed actions $a_k^{s_{n+1}} \in A_{s_{n+1}}$ in said following state $s_{n+1}$ (block 325), feeding said following state and all of said allowed actions to the deep neural network and taking a maximum of Q values produced as outputs of the deep neural network. Finally, the results of the two calculations are summed together to produce the target Q value function Q ($s_n$, $a_k^{s_n}$) (blocks 327, 328).

The computing device feeds, in block 304, the set of random states and the sets of possible random actions (generated in block 302 or 320) to the deep neural network to produce an approximate Q value function Q(s, a). Similar to earlier embodiments, s is an initial state and a is an action performed in the initial state.

The approximate Q value function Q($s_n$, $a_k^{s_n}$) given as an output of the deep neural network in the first optimization loop and the target Q value function Q($s_n$, $a_k^{s_n}$) calculated in the second optimization loop using the deep neural network are, then, compared by the computing device. Specifically, the computing device evaluates, in block 305 (and block 322), a mean squared error between the approximate Q value function and the target Q value function. The computing device updates, in block 306 (and block 323), weights of the deep neural network to minimize the mean squared error. This is the so-called fast time-scale update of the deep Q-learning network.

The process described by blocks 304 to 306 may be repeated a pre-defined number of times with the same set of random states. In other words, a pre-defined number of epochs may be used. Specifically in FIG. 3A, the computing device checks, in block 307, whether said pre-defined number for repetitions (or said pre-defined number of epochs) has been reached and if this is not the case, carry out blocks 304 to 307. The computing device may maintain a counter for keeping track of these repetitions.

Once the computing device determines in block 307 that said first pre-defined number for repetitions has been reached, a so-called slow time-scale update 329 of the deep Q-learning network has been completed. Each slow time-scale update may be called an episode or an iteration. Thereafter, the computing device determines, in block 308, whether the deep neural network has converged according to a pre-defined criteria. The pre-defined criteria may, for example, define a maximum allowed value for the mean squared error and/or a maximum allowed value for the difference between two or more consecutive calculations of the mean squared error. The pre-defined criteria may define that the mean squared error should be smaller than or equal to said maximum allowed value for a pre-defined number of consecutive calculations of the mean squared error or for a pre-defined number of consecutive episodes. When the calculated values of the mean squared error no longer go down, the weights of all the neurons in the deep neural network may be deemed to have converged. Additionally or alternatively, the pre-defined criteria may define a maximum allowed value for the variation in the approximate Q value function for a set of states and actions over two or more consecutive episodes.

If the computing device determines, in block 308, that the convergence has not occurred, the computing device repeats actions pertaining to blocks 302 to 308 (i.e., starts a new training episode). In other words, the computing device generates, in block 302, a new set of random states and a new set of possible actions in each random state and calculates, in blocks 303, using said new set of random states and said new set of possible actions as input, a 1-step iteration of the Bellman equation to produce a new target Q value function as described above though now employing the deep neural network with updated weights of neurons (that is, as updated during latest iteration of block 306). Subsequently, the actions pertaining to blocks 304 to 308 are repeated as described above (though now using the new random states and actions, the new target Q value function and the current deep neural network). If the computing device determines, in block 308, that the convergence has occurred, the computing device performs actions pertaining to blocks 204, 205 of FIG. 2 (i.e., determines optimal $P_0$ and $\alpha$ values and causes transmitting them to the plurality of access node).

FIG. 4 shows the inference part of our DQN-based process for determining the optimal power control parameters ($P_0$ and $\alpha$) for all cells based on a fully trained deep neural network. The deep neural network 402 employed in FIG. 4 may have been trained as discussed in relation to FIGS. 3A and 3B. Specifically, the deep neural network 402 in FIG. 4 may be the deep neural network discussed in relation to FIGS. 3A and 3B after convergence. The process illustrated in FIG. 4 may correspond to block 204 of FIG. 2. The process of FIG. 4 may be carried out by any of the (computing) devices carrying out the embodiments discussed in connection with FIGS. 2, 3A and 3B.

Referring to FIG. 4, the computing device, first, generates, in element 401, a zero state $s_0$ in which $P_0$ and $\alpha$ for all the plurality of cells is $-\infty$ and null, respectively. Then, the computing device inputs, in element 402, the zero state $s_0$ along with all the possible actions $a_k^{s_0} \in A_{s_0}$ in said zero state $s_0$ into a fully trained deep Q-learning network (that is, to the trained deep neural network as discussed in relation to FIGS. 3A and 3B) to produce as an output 403 a plurality of Q values Q($s_0$, $a_0^{s_0}$), Q($s_0$, $a_1^{s_0}$), . . . , Q($s_0$, $a_K^{s_0}$) for the zero state. Here, K is the number of all the possible actions.

From the plurality of Q values for the zero state, the computing device finds, in block 404, an optimal action $a_{k*}^{s_0} \in A_{s_0}$ which is an action which when taken in the zero state, leads to a maximum Q value of the plurality of Q values. In other words, the computing device determines the optimal action using the following equation:

$$a_{k*}^{s_0} = \underset{\{a_k^{s_0} \in A_{s_0}\}}{\text{argmax}} \left( Q(s_0, a_k^{s_0}) \right).$$

This optimal action defines optimal values for $P_0$ and $\alpha$ for the first cell in sequence. Therefore, the computing device sets, in block 404, said optimal values of $P_0$ and $\alpha$ for the first cell in sequence (or in general for the next cell in sequence for which valid values have not yet been defined). Further, the computing device sets, in element 405, the state following the optimal action $a_{k*}^{s_0}$ in the zero state as the current state and repeats, in element 406, the process (i.e., the process described in relation to elements 402 to 406) to produce optimal values of $P_0$ and $\alpha$ for all the plurality of cells in sequence. The end result is a state defining optimal values (or optimal settings) for $P_0$ and $\alpha$ for all of the plurality of cells without any invalid ($-\infty$ or null) values. It should be noted that the notation in relation to element 405 in FIG. 4 applies only for the first repetition or iteration of the process.

After the optimal values for $P_0$ and $\alpha$ have been determined and delivered to the plurality of terminal devices, the plurality of terminal devices configure their uplink power using the received $P_0$ and $\alpha$ values. The deep Q-learning based solution according to embodiments may specifically adapt $P_0$ and $\alpha$ to load and spatial distribution of traffic/terminal devices such that heavily loaded cells have larger $P_0$ and $\alpha$ values while their lightly loaded neighboring cells have smaller $P_0$ and $\alpha$ values, cells with larger proportion of cell-edge terminal devices have larger $P_0$ and $\alpha$ values while their neighboring cells without many cell-edge terminal devices have smaller $P_0$ and $\alpha$ values.

In general, system-wide throughput metrics may be optimized.

Figure 5:
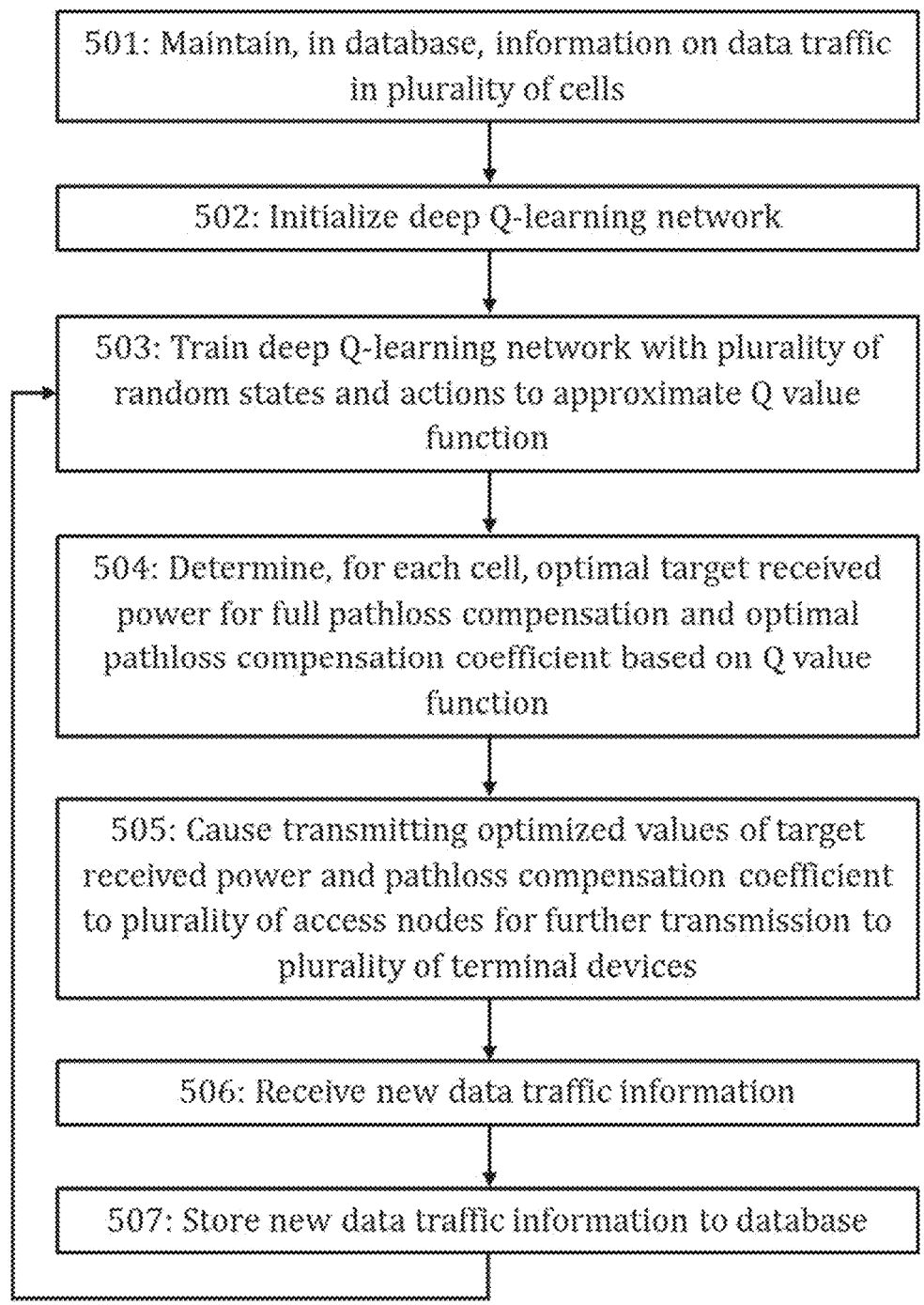

However, the traffic conditions in the plurality of cells may change over time. Therefore, there is a need for re-optimizing the setting of the $P_0$ and $\alpha$ parameters for the plurality of cells dynamically over time. FIG. 5 illustrates a process according to embodiments for performing such re-optimization. The illustrated process may be carried out by any computing device as described in relation to FIG. 2.

Referring to FIG. 5, blocks 501 to 505 (at least when initially performed) may correspond to blocks 201 to 205 of FIG. 2. Further, any of the embodiments discussed in relation to FIGS. 3A, 3B and 4 may apply also here, that is, the training in block 503 may be carried out as described in relation to blocks 302 to 309 of FIG. 3A and/or FIG. 3B and the determining in block 504 may be carried out as described in relation to FIG. 4. After some time has passed since the optimal $P_0$ and $\alpha$ settings were transmitted from the computing device to the plurality of terminal devices (via a plurality of access nodes), the computing devices receives, in block 506, further information (or new information) on data traffic in the plurality of cells (involving the plurality of terminal devices). Said further information may correspond to (latest) data traffic occurring in the plurality of cells within a certain time frame which may be a time frame after the optimal $P_0$ and $\alpha$ settings were transmitted. New information on data traffic may be transmitted to the computing device periodically (e.g., by the plurality of access nodes).

In response to receiving the new information on data traffic in block 506, the computing device stores the further information on data traffic to the database so as to supplement or update the information on data traffic already maintained in the database. For example, the computing device may update traffic density and/or SINR distributions maintained in the database to better correspond to the current data traffic conditions. Then, the computing device repeats actions pertaining to blocks 503 to 505. The difference compared to the initial generation of the Q value function is that now the previous optimization may act as the starting point for the re-optimization. In view of FIGS. 3A and 3B, the deep neural network may have, at the start of the re-optimization, the converged weights derived based on the original (or previous) information on data traffic. If no significant changes have occurred in data traffic in the plurality of cells, the previously derived Q value function may require very little fine-tuning or even no adjustments at all.

While above it was assumed that the re-optimization is triggered by the reception of new data traffic information, in other embodiments, the computing device may be constantly or continuously receiving information on data traffic from the plurality of access nodes at a high rate. In such cases, it may not be feasible to run also the re-optimization loop (i.e., blocks 503 to 506) continuously. Instead, the re-optimization may be triggered automatically with a pre-defined period and/or once a pre-defined amount of new data traffic information has been collected. In some embodiments, the re-optimization may be triggered, additionally or alternatively, if a significant change is detected (e.g., by an access node, the computing device or other network node) in the data traffic associated with the plurality of cells.

Figure 6:
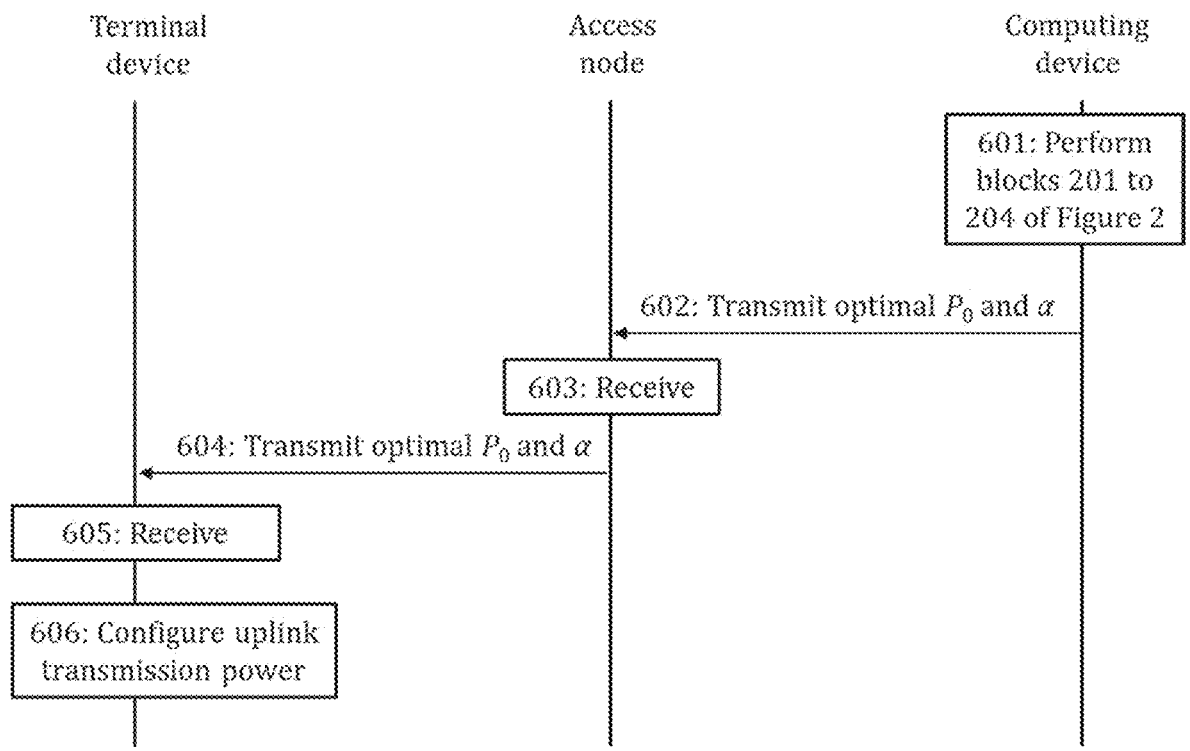

FIG. 6 is a signaling diagram illustrating how the optimal power control parameters $P_0$ and $\alpha$ are distributed from a computing device to a terminal device and how uplink transmission power of the terminal device is configured based thereon according to embodiments. While FIG. 6 illustrates only a single access node serving a single terminal device for simplicity of discussion, the processes to be discussed below are applicable in a similar manner also in a wireless communications network comprising a plurality of access nodes each of which is serving a plurality of terminal devices (or one or more terminal devices). FIG. 6 may correspond to the communications system of FIG. 1 or a part therein. Specifically, the terminal device in FIG. 6 may correspond to either of the UEs 100, in FIG. 1, the access node may correspond to the element 104 of FIG. 1 and the computing device may correspond to any of elements 108, 112, 114 of FIG. 1 or a (sub)element within any of elements 108, 110, 112, 114 of FIG. 1. In general, the computing device may be network element or node in a core network.

Referring to FIG. 6, the computing device initially performs, in block 601, blocks 201 to 204 of FIG. 2, that is, the computing device initializes and trains a deep Q-learning network and determines, for a plurality of cells, an optimal target received power per PRB for full pathloss compensation ($P_0$) and an optimal pathloss compensation coefficient ($\alpha$) using the trained deep Q-learning network. The training (i.e., block 203) may be carried out as described in relation to FIGS. 3A and 3B and/or the determining of the optimal values (i.e., block 204) may be carried out as described in relation to FIG. 4.

Then, the computing device transmits, in message 602, optimal values of $P_0$ and $\alpha$ for a cell served by an access node to said access node. The message 602 may, in some embodiments, further comprise optimal values of $P_0$ and $\alpha$ for other cells served by said access node and/or served by other access nodes. In some embodiments, the message 602 may comprise a full set of optimal values of $P_0$ and $\alpha$ for all of the plurality of cells involved in the deep Q-learning. Altogether, the computing device may transmit optimal values of $P_0$ and $\alpha$ to a plurality of access nodes serving a plurality of cells (though only one of said transmissions is explicitly shown in FIG. 6 for simplicity). As mentioned in relation above embodiments, the optimized values may be specifically communicated to RRC or MAC of the access node. The communication of the optimized values may be achieved using APIs of the radio access network (RAN) of the access node.

The access node receives, in block 603, (at least) the optimal values of $P_0$ and $\alpha$ for said cell served by said access node and consequently (or subsequently) transmits, in message 604, the optimal values of $P_0$ and $\alpha$ for said cell to a plurality of terminal devices located within the cell. In FIG. 6, only one of the plurality of terminal devices is shown for simplicity. Specifically, RRC or MAC layer of the access node may communicate the optimized values to the terminal device, for example, as a system information message and/or a RRC reconfiguration message.

The terminal device receives, in block 605, at least the optimal values of $P_0$ and $\alpha$ for the cell in which the terminal device is located from the access node. In response to the receiving, the terminal device configures its uplink transmission power based on the optimal target received power per PRB for full pathloss compensation and the optimal pathloss compensation coefficient. The uplink transmission power may be configured according to equation (1) or according to any of the more general embodiments discussed below equation (1). For example, the configuring of the uplink transmission power in block 605 may comprise selecting the uplink transmission power to be a minimum of a maximum transmission power configured for said terminal device in decibels and a sum of two or more terms in decibels, where the two or more terms comprise at least the optimal target received power per PRB for full pathloss compensation in decibels and the optimal pathloss compensation coefficient multiplied by a downlink pathloss calculated by said terminal device in decibels. In some embodiments, the configuring of the uplink transmission power (which may correspond to PUSCH transmission power) may be carried out according to equation (1).

The blocks, related functions, and information exchanges described above by means of FIGS. 2, 3A, 3B, 4, 5 and 6 in no absolute chronological order, and some of them may be performed simultaneously or in an order differing from the given one. Other functions can also be executed between them or within them, and other information may be sent and/or received, and/or other mapping rules applied. Some of the blocks or part of the blocks or one or more pieces of information can also be left out or replaced by a corresponding block or part of the block or one or more pieces of information.

Figure 7:
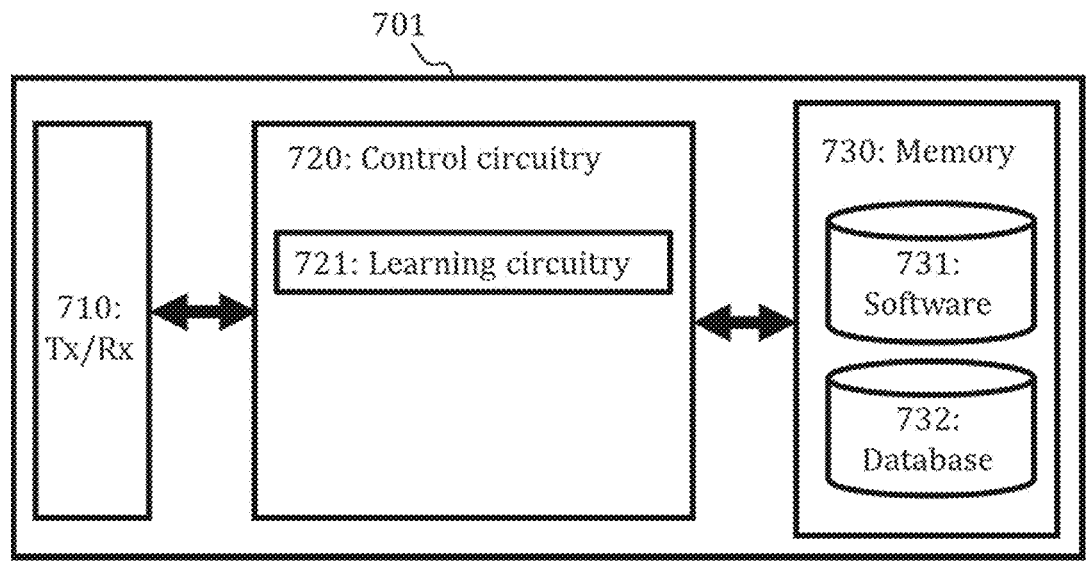
FIGS. 7 and 8 illustrate apparatuses according to embodiments.

FIG. 7 provides a computing device 701 (or alternatively an apparatus or a network element or node) according to some embodiments. FIG. 7 may illustrate a computing device configured to carry out at least the functions described above in connection with optimizing uplink power control in a plurality of cells using deep Q-learning. The computing device may correspond to any of elements 108, 112, 114 of FIG. 1 or a (sub)element within any of elements 108, 110 112, 114 of FIG. 1. The computing device 701 may comprise one or more control circuitry 720, such as at least one processor, and at least one memory 730, including one or more algorithms 731, such as a computer program code (software) wherein the at least one memory and the computer program code (software) are configured, with the at least one processor, to cause, respectively, the computing device to carry out any one of the exemplified functionalities of the computing device described above.

Referring to FIG. 7, the control circuitry 720 of the computing device comprises at least learning circuitry 721. The learning circuitry 721 may be configured to carry out the uplink power control optimization based on a deep Q-learning network according to embodiments and, to this end, to carry out at least some of the functionalities described above by means of any of FIGS. 2, 3A, 3B, 4 and 5 (and FIG. 6 in regards to the functionalities of the computing device) using one or more individual circuitries.

The memory 730 may comprise a database 732 which may comprise at least information on data traffic in the plurality of cells, as described in previous embodiments. The memory 730 may also comprise other databases which may not be related to the functionalities of the computing device according to any of presented embodiments. The memory 730 may be implemented using any suitable data storage technology, such as semiconductor based memory devices, flash memory, magnetic memory devices and systems, optical memory devices and systems, fixed memory and removable memory.

Referring to FIG. 7, the computing device may further comprise different interfaces 710 such as one or more communication interfaces (TX/RX) comprising hardware and/or software for realizing communication connectivity over the medium according to one or more communication protocols. Specifically, the communication interface 710 for a computing device (e.g., a network element in a core network) may provide the computing device with communication capabilities to communicate in the wireless communication system and enable communication between to a plurality of access nodes, a plurality of terminal device (possibly via said plurality of access nodes) and to one or more other network nodes or elements (e.g., to one or more core network elements). The communication interface may comprise standard well-known components such as an amplifier, filter, frequency-converter, (de)modulator, and encoder/decoder circuitries, controlled by the corresponding controlling units, and one or more antennas. The computing device may also comprise different user interfaces.

Figure 8:
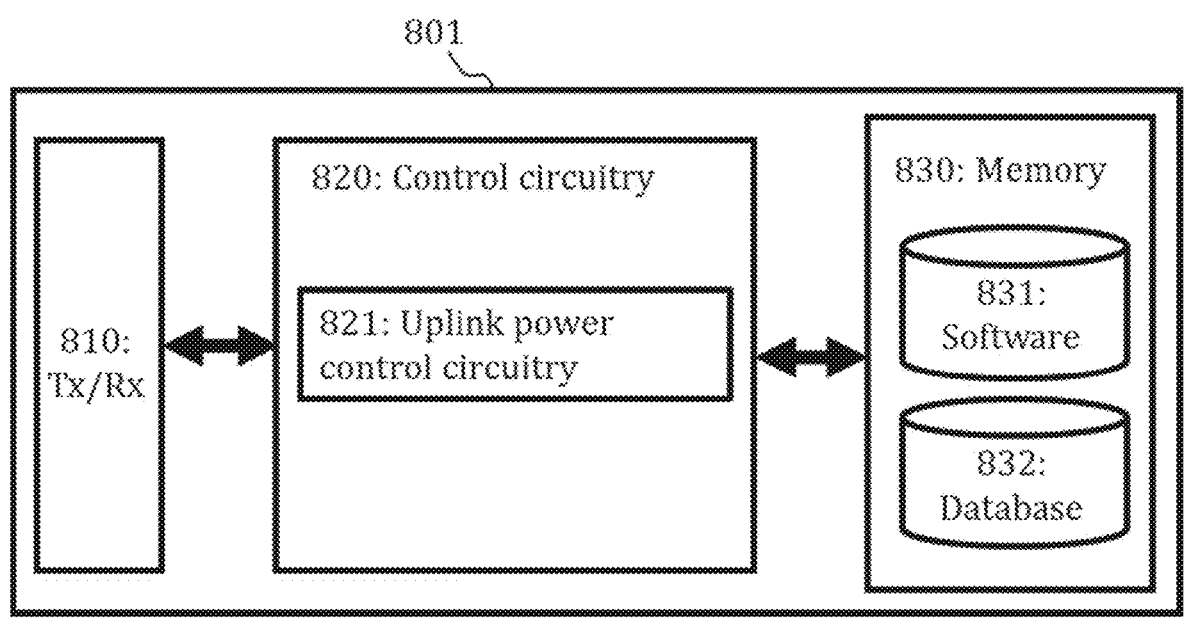

FIG. 8 provides a terminal device 801 according to some embodiments. FIG. 8 may illustrate a terminal device configured to carry out at least the functions described above in connection with configuring uplink power control based on optimal power control parameters $P_0$ and $\alpha$ (being optimized using deep Q-learning). The terminal device 801 may correspond any of UEs 100, 102 of FIG. 1. Each terminal device may comprise one or more control circuitry 820, such as at least one processor, and at least one memory 830, including one or more algorithms 831, such as a computer program code (software) wherein the at least one memory and the computer program code (software) are configured, with the at least one processor, to cause, respectively, the terminal device to carry out any one of the exemplified functionalities of the terminal device described above. The memory 830 may also comprise at least one database 832.

Referring to FIG. 8, the control circuitry 820 of the terminal device comprises at least uplink power control circuitry 821. The uplink power control may be configured to carry out the uplink power control configuration according to embodiments and, to this end, to carry out at least some of the functionalities described above by means of blocks 605, 606 of FIG. 6 using one or more individual circuitries.

The memory 830 may be implemented using any suitable data storage technology, such as semiconductor based memory devices, flash memory, magnetic memory devices and systems, optical memory devices and systems, fixed memory and removable memory.

Referring to FIG. 8, the terminal device may further comprise different interfaces 810 such as one or more communication interfaces (TX/RX) comprising hardware and/or software for realizing communication connectivity over the medium according to one or more communication protocols. Specifically, the communication interface 810 for a terminal device may provide the terminal device with communication capabilities to communicate in the wireless communication system and enable communication to one or more of access nodes, a plurality of terminal device (possibly via said plurality of access nodes) and/or to one or more other network nodes or elements. The communication interface may comprise standard well-known components such as an amplifier, filter, frequency-converter, (de)modulator, and encoder/decoder circuitries, controlled by the corresponding controlling units, and one or more antennas. The terminal device may also comprise different user interfaces.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In embodiments, the at least one processor, the memory, and the computer program code form processing means or comprises one or more computer program code portions for carrying out one or more operations according to any one of the embodiments of FIGS. 2, 3A, 3B, 4, 5 and 6 or operations thereof.

In an embodiment, at least some of the processes described in connection with FIGS. 2, 3A, 3B, 4, 5 and 6 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2, 3A, 3B, 4, 5 and 6 or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2, 3A, 3B, 4, 5 and 6 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A computing device for controlling uplink transmission power of a plurality of terminal devices in a plurality of cells,
wherein each terminal device is configured to determine uplink transmission power based on at least a target received power per physical resource block, PRB, for full pathloss compensation and a pathloss compensation coefficient, the computing device comprising at least one processor; and at least one memory including computer program code, said at least one memory and computer program code being configured, with said at least one processor, to cause the computing device to perform:
maintaining, in a database, information on data traffic in the plurality of cells involving the plurality of terminal devices;
initializing a deep Q-learning network in which
a state is defined as a set of pairs of the target received power per PRB for full pathloss compensation and the pathloss compensation coefficient, wherein each pair corresponds to one of the plurality of cells,
an action in a given state is defined as a selection of valid values of the target received power per PRB for full pathloss compensation and the pathloss compensation coefficient for a pair currently having invalid values and a reward of taking an action is calculated based on the information on the data traffic in the plurality of cells so as to optimize overall uplink performance over all of the plurality of cells;

training the deep Q-learning network with a plurality of random states and a plurality of random actions to approximate a Q value function, wherein each random state comprises initially a pre-defined number of pairs of the target received power per PRB for full pathloss compensation and the pathloss compensation coefficient having random valid values with a rest of the pairs in each random state having invalid values, said rest of the pairs comprising at least one pair;

determining, for each cell, an optimal target received power per PRB for full pathloss compensation and an optimal pathloss compensation coefficient based on the Q value function; and causing transmitting optimized values of the target received power per PRB for full pathloss compensation and the pathloss compensation coefficient to the plurality of access nodes for further transmission to the plurality of terminal devices.

2. The computing device of claim 1, wherein the information on data traffic may comprise, for each cell of the plurality of cells, information on one or more of the following: traffic density, user distribution, configuration of terminal devices within said cell, channel characteristics, intra-cell interference and inter-cell interference.

3. The computing device of claim 1, wherein said at least one memory and computer program code are further configured, with said at least one processor, to cause the computing device to perform: receiving further information on data traffic in the plurality of cells involving the plurality of terminal devices; storing the further information on data traffic to the database to supplement or update the information on data traffic maintained in the database; and re-optimizing the deep Q-learning network to take into account the further information by repeating the training, the determining and the causing transmitting.

4. The computing device according to claim 1, wherein the Q value function for a state and an action in the deep Q-learning network is defined as a sum of the reward for said state and action and a maximum cumulative reward of all states and actions following from said state when said action is performed.

5. The computing device according to claim 1, wherein the training of the deep Q-learning network comprises:

a) generating a set of random states and a set of possible random actions in each random state in the set of random states;

b) calculating, using the set of random states and the sets of possible actions as input, a target Q value function as 1-step iterations of the Bellman equation $$Q(s_n, a_k^{s_n}) = r(s_n, a_k^{s_n}) + \max_{\left(a_k^{s_{n+1}} \in A_{s_{n+1}}\right)} Q(s_{n+1}, a_k^{s_{n+1}}),$$

wherein $Q(s_n, a_k^n)$ is the target Q value function $s_{n+1}$ is a state following an initial state $s_n$ when an action $a_k^s{}_n$ is taken, $a_k^s{}_{n+1}$ is an action performed in the state $s_{n+1}$ $r(s_n, a_k^s{}_n)$ is a reward from taking the action $a_k^s{}_n$ in the state $s_n$, $As_{n+1}$ is an action space comprising all possible actions $a_k^s{}_{n+1}$ and max $Q(s_{n+1}, a k^n{+}')$ is calculated by using a deep neural network to evaluate all possible Q values $$Q(s_{n+1}, a_k^{s_{n+1}}) \text{ with } a_k^{s_{n+1}} \in A_{s_{n+1}};$$

c) feeding the set of random states and the sets of possible random actions to the deep neural network to produce an approximate Q value function Q (s, a), wherein s is an initial state and a is an action performed in the initial state;

d) evaluating a mean squared error between the approximate Q value function and the target Q value function;

e) updating weights of the deep neural network to minimize the mean squared error;

f) repeating steps c) and e) with the same set of random states and the same sets possible random actions until a pre-defined number of repetitions is reached; and g) repeating steps a) to f) with a different set of random states and corresponding sets of possible random actions generated each time until the mean squared error between the approximate Q value function and the target Q value function is detected to converge.

6. The computing device of claim 5, wherein the calculating of the 1-step iterations of the Bellman equation comprises:

calculating the reward $r(s_n, a_k^s{}_n)$, using a lookup table maintained in the database or using online calculation;

calculating max $Q(s_{n+1}, a_k^s{}_{n+1})$ by generating, for each combination of $$\{a_k^s{}_{n+1} \in A s_{n+1}\}$$

an initial state $s_n$ and an action $a_k^s{}_n$ performed in the initial state, a following state $s_{n+1}$ and all allowed actions $a_k^s{}_{n+1} \in As_{n+1}$ in said following state $s_{n+1}$ feeding said following state and all of said allowed actions to the neural network and taking a maximum of Q values produced as outputs of the neural network; and calculating a sum of $r(s_n, a_k^s{}_n)$ and max $Q(s_{n+1}, a_k^s{}_{n+1})$.

$$\{a_k^s{}_{n+1} \in A s_{n+1}\}$$

7. The computing device according to claim 1, wherein the determining of the optimal target received power per PRB for full pathloss compensation and the optimal pathloss compensation coefficient comprises:

1) generating a zero state in which the target received power per PRB for full pathloss compensation and the pathloss compensation coefficient for all of the plurality of cells have invalid values, wherein the zero state is defined as a current state;

2) inputting the current state along with all possible actions in said current state into the deep Q-learning network to produce as an output a plurality of Q values for the current state;

3) finding, from the plurality of Q values for the current state, an optimal action which is an action which when taken in the current state leads to a maximum Q value of the plurality of Q values and associated optimal values for the target received power per PRB for full pathloss compensation and the pathloss compensation coefficient;

4) setting said optimal values for the next cell in sequence for which valid values have not yet been defined;

5) setting the state following the optimal action taken in the current state as the current state; and 6) repeating steps 2) to 5) until optimal values for all of the plurality of cells have been determined.

8. The computing device according to claim 1, wherein valid values of the target received power per PRB for full pathloss compensation and the pathloss compensation coefficient are limited to a pre-defined range of values with a pre-defined spacing defined separately for the target received power per PRB for full pathloss compensation and the pathloss compensation coefficient, an invalid value of the target received power per PRB for full pathloss compensation is defined as $-\infty$ dBm and an invalid value of the pathloss compensation coefficient is defined as null.

9. The computing device according to claim 1, wherein the reward is defined as a difference of a sum-utility of all cells in the plurality of cells for which valid values have been set including the new cell and sum-utility of all cells in the plurality of cells for which valid values have been set excluding the new cell, the sum-utility being defined as a geometric mean or a sum of terminal device throughputs of terminal devices in one or more cells for which valid values have been set or as a sum of signal to interference and noise ratios of terminal devices in one or more cells for which valid values have been set.

10. The computing device according to claim 9, wherein the sum-utility is calculated as:

$$SU = \prod_{i:P_{o,i} \neq -\infty, \alpha_i \neq null} \prod_{(x,y,z) \in i} \left( \log\left(1 + \frac{G_i(x, y, z)P_i(x, y, z)}{q(x', y', z')}\right) \right)^{\rho_i(x,y,z)} \text{ wherein,}$$

$$q(x', y', z') = \sigma^2 + \sum_{\substack{j \\ j \neq i}} \sum_{(x', y', z') \in j} \frac{\rho_j(x', y', z')}{\sum_{(x', y', z') \in j}(x', y', z')} G_i(x', y', z')P_j(x', y', z'),$$

$P_j$ (x, y, z) is a traffic density of a given (x, y, z) coordinate point for a cell j, $\sigma^2$ is the thermal noise variance, $G_i$ (x, y, z) is the channel gain to a presumed terminal device at the point (x, y, z) in the cell i to the serving cell i, Pi (x, y, z) is the transmit power of a terminal device at the point (x, y, z) served by the cell i dependent on values of the target received power per PRB for full pathloss compensation $P_{0,i}$ and the pathloss compensation coefficient $\alpha_i$ for the cell i and $-\infty$ and null are, respectively, invalid values for the target received power per PRB for full pathloss compensation and the pathloss compensation coefficient.

11. The computing device according to claim 1, wherein each terminal device of the plurality of terminal devices is configured to determine uplink transmission power as a minimum of a maximum transmission power configured for said terminal device in decibels and a sum of two or more terms in decibels, the two or more terms comprising at least the target received power per PRB for full pathloss compensation in decibels and the pathloss compensation coefficient multiplied by a downlink pathloss calculated by said terminal device in decibels.

12. The computing device according to claim 1, wherein the computing device is a network element for a core network.

13. A method for controlling uplink transmission power of a plurality of terminal devices in a plurality of cells, wherein each terminal device is configured to determine uplink transmission power based on at least a target received power per physical resource block, PRB, for full pathloss compensation and a pathloss compensation coefficient, the method comprising:
   maintaining, in a database, information on data traffic in the plurality of cells involving the plurality of terminal devices;
   initializing a deep Q-learning network in which
      a state is defined as a set of pairs of the target received power per PRB for full pathloss compensation and the pathloss compensation coefficient, wherein each pair corresponds to one of the plurality of cells,
      an action in a given state is defined as a selection of valid values of the target received power per PRB for full pathloss compensation and the pathloss compensation coefficient for a pair currently having invalid values and
      a reward of taking an action is calculated based on the information on the data traffic in the plurality of cells so as to optimize overall uplink performance over all of the plurality of cells;
   training the deep Q-learning network with a plurality of random states and a plurality of random actions to approximate a Q value function, wherein each random state comprises initially a ore-defined number of pairs of the target received power per PRB for full pathloss compensation and the pathloss compensation coefficient having random valid values with a rest of the pairs in each random state having invalid values, said rest of the pairs comprising at least one pair;
   determining, for each cell, an optimal target received power per PRB for full pathloss compensation and an optimal pathloss compensation coefficient based on the Q value function; and
   causing transmitting optimized values of the target received power per PRB for full pathloss compensation and the pathloss compensation coefficient to the plurality of access nodes for further transmission to the plurality of terminal devices.

14. A non-transitory computer readable medium stores instructions, which when executed by at least one processor, causes a computing device including the processor to perform at least the following:
   initializing a deep Q-learning network in which
      a state is defined as a set of pairs of a target received power per physical resource block, PRB, for full pathloss compensation and a pathloss compensation coefficient, wherein each pair corresponds to one of a plurality of cells,
      an action in a given state is defined as a selection of valid values of the target received power per PRB for full pathloss compensation and the pathloss compensation coefficient for a pair currently having invalid values and
      a reward of taking an action is calculated based on information on data traffic in the plurality of cells by a plurality of terminal devices so as to optimize overall uplink performance over all of the plurality of cells, the information on data traffic being maintained in a database;
   training the deep Q-learning network with a plurality of random states and a plurality of random actions to approximate a Q value function, wherein each random state comprises initially a pre-defined number of pairs of the target received power per PRB for full pathloss compensation and the pathloss compensation coefficient having random valid values with a rest of the pairs in each random state having invalid values, said rest of the pairs comprising at least one pair;
   determining, for each cell, an optimal target received power per PRB for full pathloss compensation and an optimal pathloss compensation coefficient based on the Q value function; and causing transmitting optimized values of the target received power per PRB for full pathloss compensation and the pathloss compensation coefficient to the plurality of access nodes for further transmission to a plurality of terminal devices, wherein each terminal device is configured to determine uplink transmission power based on at least the target received power per PRB for full pathloss compensation and the pathloss compensation coefficient.

* * * * *